July 31, 1923.
W. L. PAUL
LEVER
Filed March 5, 1921
1,463,333
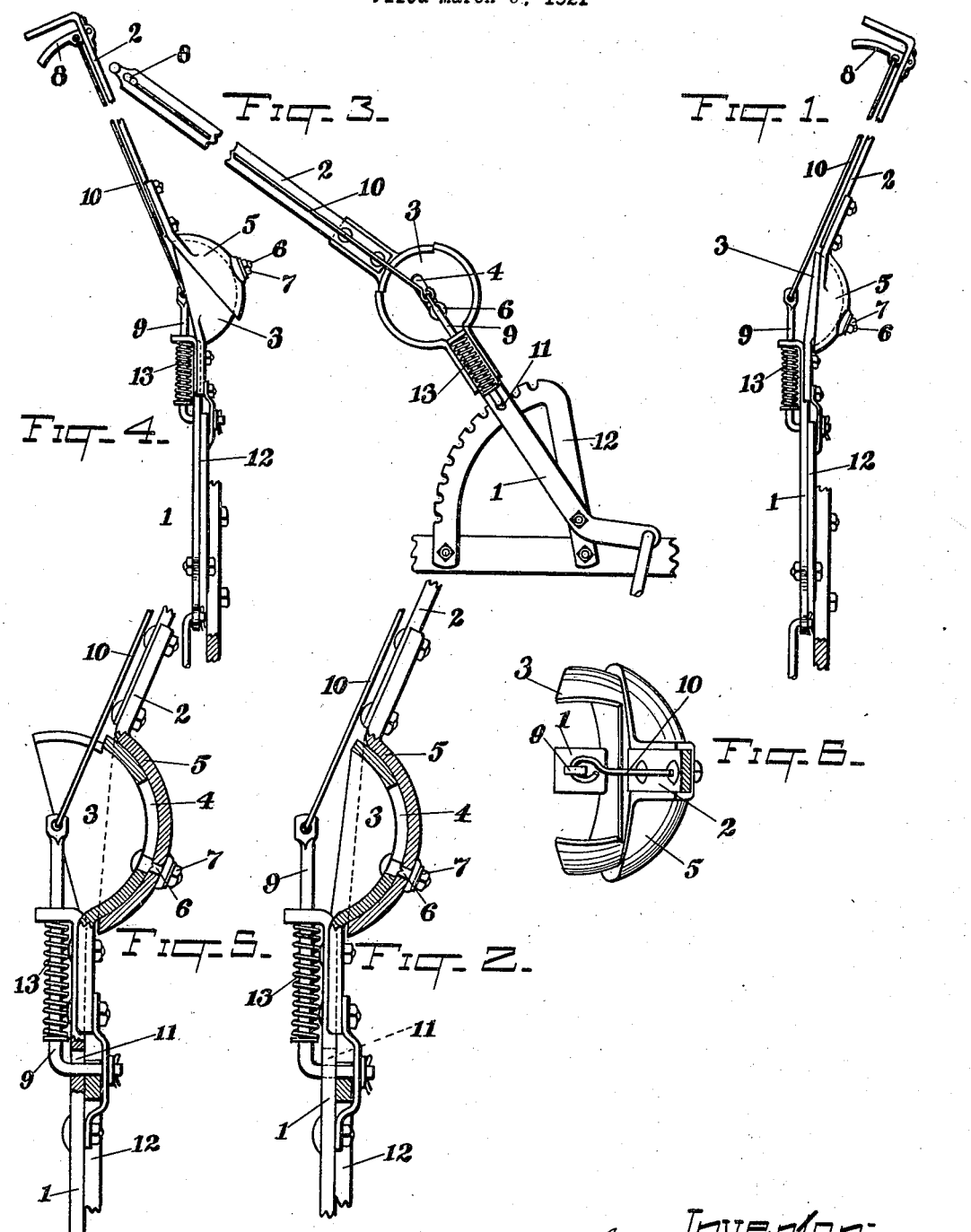

Patented July 31, 1923.

1,463,333

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

LEVER.

Application filed March 5, 1921. Serial No. 450,051.

*To all whom it may concern:*

Be it known that I, WILLIAM L. PAUL, a citizen of the United States, residing at Berkeley, in the county of Alameda and State of California, have invented certain new and useful Improvements in Levers, of which the following is a specification, reference being had therein to the accompanying drawing.

My invention relates to a lever mechanism in which the lever itself is divided and having one part adjustable to varying degrees of angularity to accommodate the reach of an operator.

Referring to the drawings in which similar numerals indicate identical parts—

Figure 1 is an elevation viewed in the direction of movement of the lever.

Figure 2 is an enlarged similar view in part section and broken.

Figure 3 is a side view of a modification of my device.

Figure 4 is an elevation of Figure 3 viewed in the direction of movement of the lever.

Figure 5 is an enlarged broken view in part section of Figure 4 but with the upper part of the lever at a different adjustment, and Figure 6 is a transverse section on the line 6—6 of Figure 5.

The lever consists of two parts 1 and 2. The segments 3 and 5 are concentric to the connection of the rod 10 with the dog 9, consequently there is little lost motion of the rod and dog irrespective of the angular position of the part 2 of the lever, and it is also true, as shown, that the bolt 6 is radial to said connection. Figure 1 is presumed to be pivotally mounted on a machine where it is to be used, its lower end extending beyond the pivot and connected to a part to be moved. Rigidly secured on the upper end of the part 1 is a spherical segment 3 having a central vertical slot 4 and fitting snugly in a similar spherical segment 5 rigidly secured on the lower end of the part 2 of the lever. The two segments are held together by a bolt 6 which extends through the slot 4 and the segment 5 and is provided with a nut 7 by the operation of which the segments are clamped rigidly together or which when loosened permits the segment 5 to move freely on the segment 3 to adjust the part 1 of the lever as may be desired.

A latch 8, on the free end of the part 2, is connected to a dog 9 by a rod 10; the dog 9 extends through the upper end of the part 1 of the lever, which is bent at a right angle to the main portion; the lower end of the dog 9 is bent to extend through a slot 11 in the part 1 so as to engage with the usual type of notched sector 12, and is retained in such engagement by a coiled spring 13 which is mounted on the dog 9 and compressed between a washer on the dog and the bent end of the part 1.

By loosening the nut 7 the part 2 can be readily alined with the part 1, the segment 5 moving freely over the segment 3, and when the alinement is completed the nut 7 is tightened holding the two segments rigidly together, the bolt at this time being substantially midway of the slot 4 and central of the segment 3. When the parts are in this position the part 2 can be swung to either side of the medial line of the part 1, in the vertical plane thereof, and secured in the desired position by tightening the nut 7 which has been previously loosened to permit this adjustment. It is also apparent that when the nut 7 is loose the part 2 can be swung to either side of the vertical plane of the part 1 and secured in the position desired.

In the modification shown in Figures 3, 4, 5 and 6 the surface area of the segment 3 is increased to provide a greater bearing for the segment 5, I do not find this necessary in practice, however, as the construction shown in Figures 1 and 2 meet all ordinary requirements.

This lever is particularly valuable on any mechanism where an operator is positioned out of the ordinary reach of a straight lever, for as shown and described it is readily made convenient to the reach of an operator by adjusting the part 2.

What I claim is—

1. A lever composed of two parts and having one of said parts pivotally mounted on a support, means for connecting the two parts together, said means including a spherical segment rigidly secured on the pivoted part, a spherical segment rigidly secured on the other part and superimposed on the first segment, and means to secure the segments together.

2. A lever composed of two parts and having one of said parts pivotally mounted on a support, means for connecting the two parts together, said means including a spherical segment rigidly secured on the pivoted part, a spherical segment rigidly secured on the other part and adjustably superimposed on the first segment, and means to secure the segments together.

3. A lever composed of two parts and having one of said parts pivotally mounted on a support, means for connecting the two parts together, said means including a spherical segment rigidly secured on the pivoted part, a vertical slot in said segment, a spherical segment rigidly secured on the other part and adjustably superimposed on the first segment, and a bolt extending through said slot and the second segment.

4. A lever composed of two parts and having one of said parts pivotally mounted on a support, means for connecting the two parts together, said means including a spherical segment rigidly secured on the pivoted part, a spherical segment rigidly secured on the other part and adjustably superimposed on the first segment, a notched sector mounted on the support, a dog on the pivoted part adapted to engage with the notched sector, a rod on the second part of the lever and connected to said dog, and a bolt operating to hold the spherical segments together and radial to the point of connection of said rod and dog.

WILLIAM L. PAUL.